United States Patent
Majewski et al.

(10) Patent No.: US 12,132,323 B2
(45) Date of Patent: Oct. 29, 2024

(54) SYSTEM AND METHOD FOR PROVIDING SUPPLEMENTAL POWER TO ENERGY HARVESTING WIRELESS SENSING DEVICES

(71) Applicant: Honeywell International Inc., Charlotte, NC (US)

(72) Inventors: Joseph Majewski, Huntington, NY (US); Ramdas Pai, Cary, NC (US)

(73) Assignee: Honeywell International Inc., Charlotte, NC (US)

( * ) Notice: Subject to any disclaimer, the term of this patent is extended or adjusted under 35 U.S.C. 154(b) by 121 days.

(21) Appl. No.: 17/929,175

(22) Filed: Sep. 1, 2022

(65) Prior Publication Data
US 2024/0079905 A1    Mar. 7, 2024

(51) Int. Cl.
*H02J 50/00* (2016.01)

(52) U.S. Cl.
CPC .......... *H02J 50/001* (2020.01); *H02J 50/005* (2020.01)

(58) Field of Classification Search
CPC ........ H02J 50/001; H02J 50/005; H02J 50/10; H02J 50/80; H02J 7/0042; H02J 11/00; H02J 13/00002; H02J 2207/20; H02J 2207/50; H02J 3/18; H02J 50/00; H02J 50/12; Y02T 10/70; Y02T 10/7072; H10N 30/20; H10N 30/30; H10N 30/306; H10N 30/40; H10N 30/802
See application file for complete search history.

(56) References Cited

U.S. PATENT DOCUMENTS

| | | | | |
|---|---|---|---|---|
| 8,816,633 B1* | 8/2014 | Neal | ...................... | H01M 10/44 |
| | | | | 320/101 |
| 2015/0326136 A1* | 11/2015 | Strzalkowski | ........ | H02M 5/293 |
| | | | | 323/355 |
| 2017/0271910 A1* | 9/2017 | Lazaro | ..................... | G06K 7/00 |
| 2021/0099127 A1* | 4/2021 | Damaraju | ................ | B60L 1/20 |

* cited by examiner

*Primary Examiner* — Lincoln D Donovan
*Assistant Examiner* — Tyler J Pereny
(74) *Attorney, Agent, or Firm* — Alston & Bird LLP

(57) ABSTRACT

Systems and methods for providing harvested energy to a wireless sensor bundle are disclosed. The method may include: receiving, at a harvesting manager circuit, power from an energy harvesting device; transferring power from the harvesting manager circuit to an energy storage device; receiving, at a power distribution manager circuit, power from the energy storage device; transferring power from the power distribution manager circuit to a wireless sensor bundle, the wireless sensor bundle comprising at least one sensor, and the amount of power distributed to the wireless sensor bundle being based on a power demand of the at least one sensor; wherein the power from the energy harvesting device includes power generated from an AC phase harvesting device, the AC phase harvesting device includes an inductor attached to a feed wire of one phase of an electric actuator, the inductor generating an electric current by induction from the feed wire.

20 Claims, 6 Drawing Sheets

SYSTEM AND METHOD FOR PROVIDING SUPPLEMENTAL POWER TO ENERGY HARVESTING WIRELESS SENSING DEVICES

TECHNICAL FIELD

The present disclosure relates generally to systems and methods for providing supplemental power. More particularly, and without limitation, the present disclosure relates to systems and methods for providing supplemental power to energy harvesting wireless sensing devices.

BACKGROUND

Motor-driven rotating machines are used in a variety of industrial automation, commercial HVAC, and process industries. Rotating machines may include any machines that include rotating members, such as pumps, chillers, compressors, fans, etc. Because rotating machines often involve high service lives, heavy usage, heavy loads, and/or fast rotational speeds, rotating machines can be prone to failing without warning.

Typically, these motor-driven rotating machines do not provide extensive sensing capabilities beyond periodic readings of environmental conditions and basic machine status. Furthermore, these sensed quantities have limited use in predictive maintenance because they are often lagging indicators of machine degradation. As such, unplanned downtime, labor-intensive maintenance, and increased repair costs result.

Predictive maintenance is intended to address these problems by using more advanced sensing strategies combined with machine learning models to leverage the sensed data. This data includes tri-axial vibration, ultrasonic, and acoustic measurements made in the rotating machine's environment.

To incorporate predictive maintenance into existing rotating machines that were not constructed with predictive maintenance capabilities, so-called "lick and stick" sensor bundles have been provided. These sensor bundles are part of an overlay system added to the machines in situ in the environment of use. The sensor bundles are equipped with convenient mounting options, such as magnets, stud mounts, etc., and typically communicate wirelessly to obviate the need for additional wiring or hardware.

Typically, the low voltage direct current power that is useful to the wireless sensor bundles is not available near the machines being monitored. As such, wireless sensor bundles are generally either battery powered or have some form of energy harvesting capability to power them. However, existing wireless sensor bundle power means have several drawbacks.

Wireless sensor bundles that are powered by a non-rechargeable battery typically have only 2-5 years of battery life under optimal conditions and far less if large amounts of data are transmitted. Although batteries can supplement energy harvesting temporarily, they have a limited lifespan. Re-charging batteries in situ is typically not practical because the limited current available from harvesting sources is not sufficient to charge many rechargeable batteries.

Additionally, wireless sensor bundles that rely on energy harvesting alone often encounter situations where they cannot harvest enough power to transmit the large streams of data to the predictive maintenance system necessary for accurate remaining useful life and early fault detection.

The present disclosure is directed to overcoming these above-referenced challenges.

SUMMARY

Various embodiments of the present disclosure relate generally to improving systems and methods for providing supplemental power to energy harvesting wireless sensing devices. Each of the embodiments disclosed herein may include one or more of the features described in connection with any of the other disclosed embodiments.

According to some embodiments, a system is disclosed including an electric actuator driving a rotating machine; a wireless sensor bundle configured to sense parameters of the rotating machine; an AC phase harvesting device configured to harvest electrical energy from the electric actuator; a thermo-electric energy harvesting device configured to harvest heat energy; a resistor coupled to the thermo-electric energy harvesting device and electrically connected to the AC phase harvesting device, wherein at least a first portion of the electrical energy harvested by the AC phase harvesting device is used to provide an electrical current to the resistor, the electrical current heating the resistor, and heat from the resistor being harvested by the thermo-electric energy harvesting device; a harvesting manager circuit configured to receive power from the thermo-electric energy harvesting device; an energy storage device configured to store power transmitted from the harvesting manager circuit; and a power distribution manager circuit configured to transfer power from the energy storage device to the wireless sensor bundle.

According to some embodiments, a system is disclosed including an electric actuator driving a rotating machine; a wireless sensor bundle configured to sense parameters of the rotating machine indicative of degradation; an AC phase harvesting device configured to harvest electrical energy from the electric actuator; a harvesting manager circuit configured to receive power from the AC phase harvesting device; an energy storage device configured to store power from the harvesting manager circuit; and a power distribution manager circuit configured to transfer power from the energy storage device to the wireless sensor bundle; wherein the AC phase harvesting device includes an inductor attached to a feed wire of the electric actuator, the inductor generating an electric current by induction from the feed wire.

According to yet other embodiments, a computer-implemented method is disclosed comprising: receiving, at a harvesting manager circuit, power from an energy harvesting device; transferring power from the harvesting manager circuit to an energy storage device; receiving, at a power distribution manager circuit, power from the energy storage device; transferring power from the power distribution manager circuit to a wireless sensor bundle, the wireless sensor bundle comprising at least one sensor, and the amount of power distributed to the wireless sensor bundle being based on a power demand of the at least one sensor; wherein the power from the energy harvesting device includes power generated from an AC phase harvesting device, the AC phase harvesting device comprising an inductor attached to a feed wire of an electric actuator, the inductor generating an electric current by induction from the feed wire.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate exemplary embodiments of the present disclosure and, together with the description, serve to explain the principles of the disclosure.

DETAILED DESCRIPTION

Figure 1:
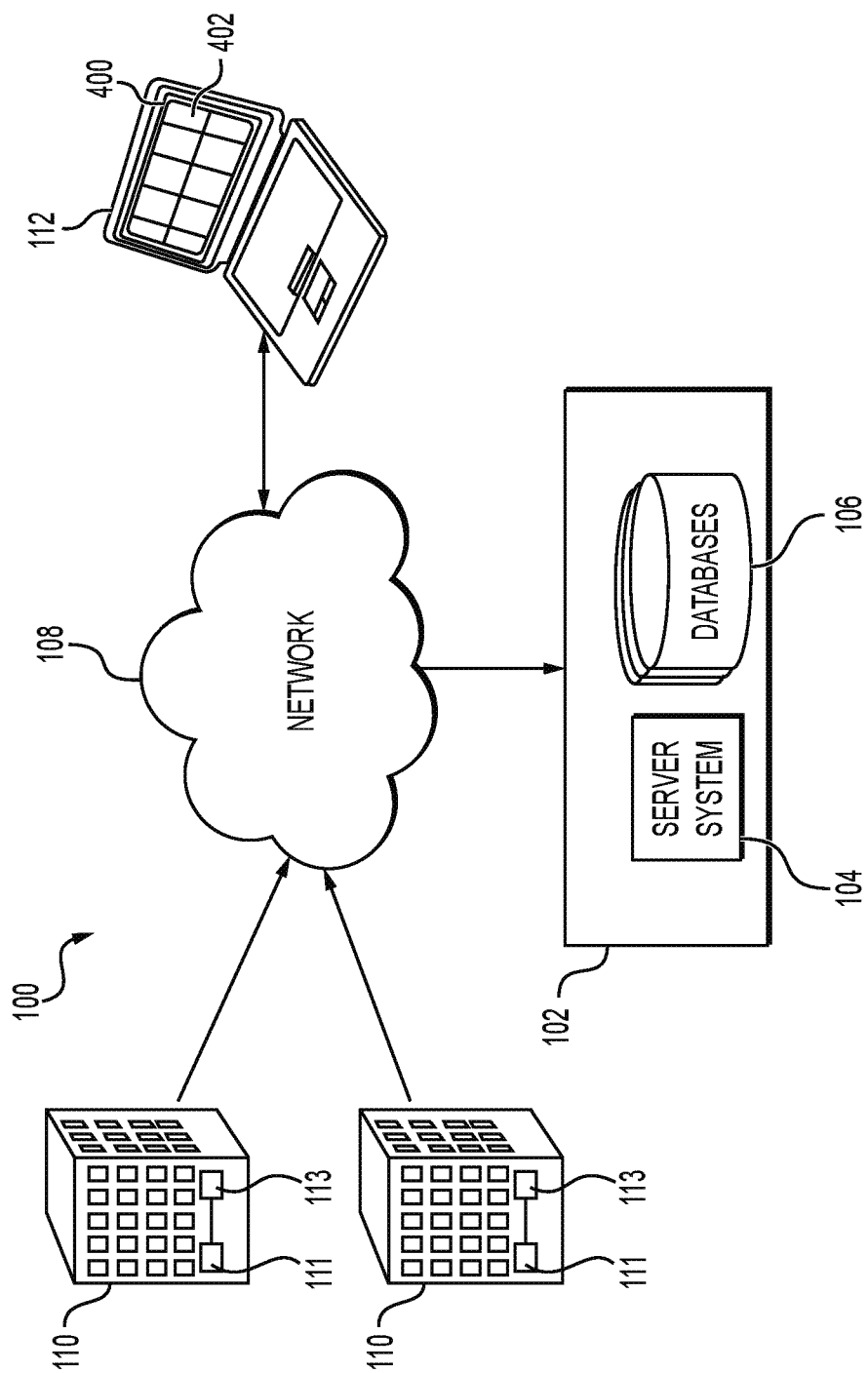
FIG. 1 shows a block diagram of a system for monitoring a rotating machine, consistent with exemplary embodiments of the present disclosure.

The present disclosure describes systems and methods for providing supplemental power to energy harvesting wireless sensing devices.

In an exemplary embodiment, a wireless sensor bundle attached to a rotating machine senses a variety of parameters associated with the machine. The sensor may include any desired environmental or condition sensor, such as a tri-axial vibrational sensor, an ultrasonic sensor, and/or acoustic sensor, among others. Temperature and humidity sensors may also be provided in the wireless sensor bundle. The bundle may include a rechargeable battery and may receive harvested energy from a plurality of sources, including a photovoltaic harvesting device, a piezoelectric harvesting device, a thermo-electric energy harvesting device, and an AC phase harvesting device.

The energy harvesting devices are selected specifically to provide energy from sources available in the environment in which the rotating machines will be situated. The photovoltaic harvesting device converts ambient sunlight into useable energy. The piezoelectric harvesting device converts vibrations into electrical energy. The thermo-electric energy harvesting device converts ambient heat to electricity. Additionally, the AC phase harvesting device has the ability to harvest energy from the electric actuator driving the rotating machine. There are at least two ways in which the AC phase harvesting device can harvest useable power from the electric actuator: either by converting inductive-sourced electric current from the feed wires of the electric actuator, e.g. from at least one of the phases of a polyphase electric motor, into useable energy; or from the magnetic fields generated by the electric actuator.

Motor-driven rotating machines used in industrial automation, commercial HVAC, or process industries may be driven by a variety of electric actuators, such as switched reluctance motors, brushless DC motors, diesel-electric generators, etc. Furthermore, the actuators may be linear, or spherical, and are not limited to solely rotary actuation. The AC phase harvesting device may be employed to harvest energy from any of these types of actuators, requiring only a time varying component of electric current sufficient to induce current in an inductor to be harvested. Most motor-driven rotating machines in industrial automation, commercial HVAC, or process industries are driven by polyphase alternating current motors, of which three phase motors are the most common. As such, an exemplary embodiment will be described in more detail with respect to an AC phase harvesting device harvesting energy from a three-phase rotary motor.

Typically, the feed wires of a three phase motor will be within reasonably easy reach even after the motor is already situated in its operational environment. As such, an AC phase harvesting device may harvest energy from the motor by providing an inductor in proximity to one of the feed wires of the three phase motor. The proximity required will be apparent to one of ordinary skill in the art, and is determined by the distance required to induce a measurable current in the inductor coil. Additionally, the AC phase harvesting device may harvest energy from the motor by providing an inductor in the magnetic field generated by the three phase motor. An inductor placed in a magnetic field will acquire an induced current, and this induced current may be used to provide power to the wireless sensor bundle.

The wireless sensor bundle includes an energy harvesting manager circuit that receives the harvested energy from the plurality of energy harvesting devices and converts all of the harvested energy into useable low voltage power to provide to the wireless sensors. The harvested energy from the AC phase harvesting device may be fed directly into the harvesting manager, and/or it may be used to heat an element provided on the thermo-electric energy harvesting device, thereby increasing the amount of energy the thermo-electric energy harvesting device harvests. The latter has the advantage of being more easily integrated into existing harvesting managers that already include a thermo-electric energy harvesting device providing energy thereto.

Reference will now be made in detail to the exemplary embodiments of the disclosure, examples of which are illustrated in the accompanying drawings. Wherever possible, the same reference numbers will be used throughout the drawings to refer to the same or like parts.

FIG. 1 depicts a block diagram of a system 100 for monitoring the health of a rotating machine used in an industrial system, such as in the HVAC system of a commercial building 110, according to one or more embodiments. In general, system 100 comprises a plurality of industrial applications, e.g., buildings, 110, mobile computing devices 112, and a control system 102 all disposed in communication with each other via a network 108, such as the Internet.

As shown in FIG. 1, control system 102 may include a server system 104 and one or more databases 106. The server system 104 may include one or more processors configured to execute instructions for monitoring the health of a rotating machine, as further detailed below. The server system 104 may include an application program interface (API) server, web page servers, processing servers, analytics servers, or any other types of front-end or back-end servers. Control system 102 may be connected to a network 108, such as a cloud-based network.

Figure 3:
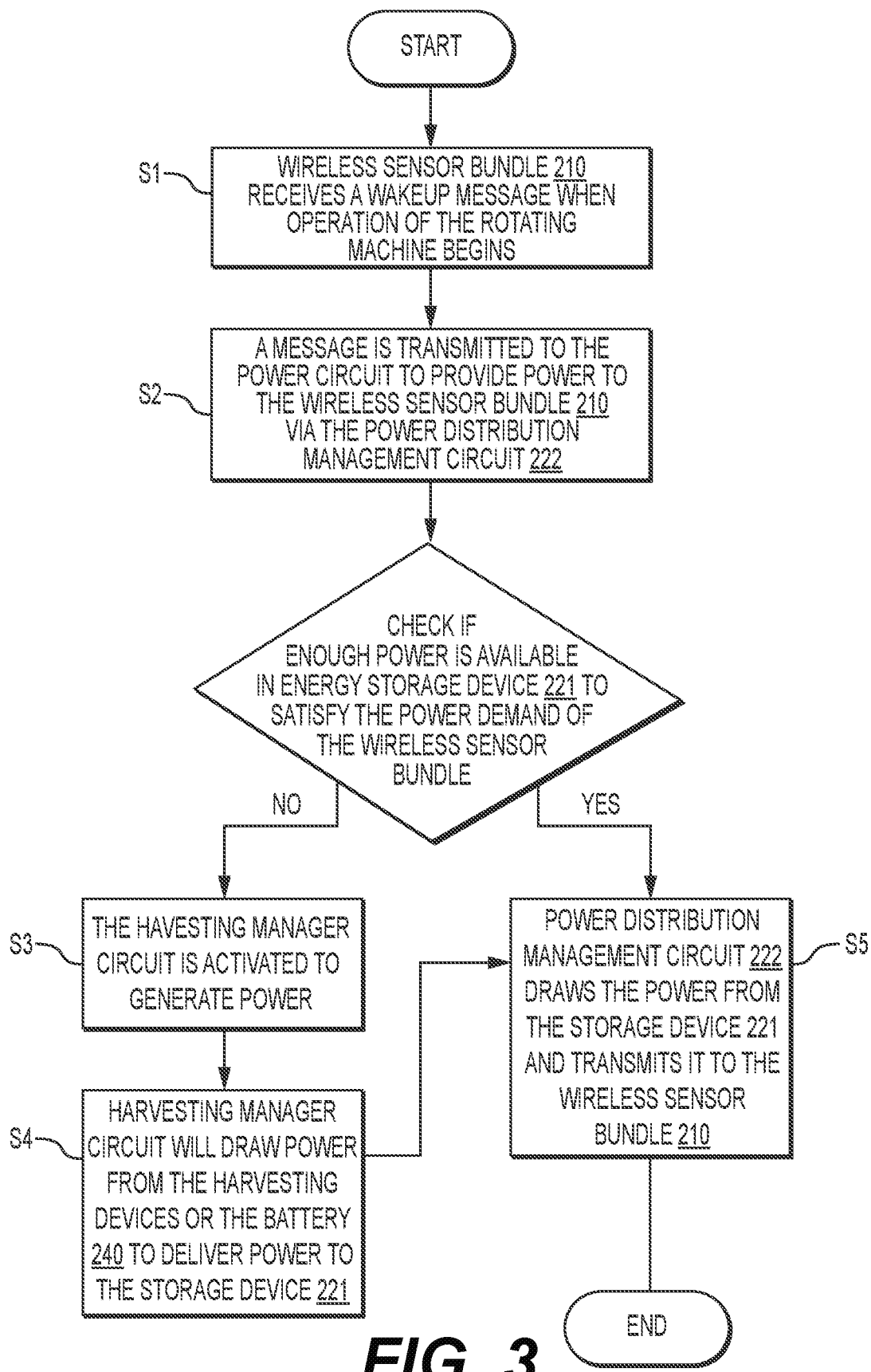
FIG. 3 is a flow chart showing a method for providing power using the power circuit of FIG. 2.

One or more industrial applications, such as one or more HVAC systems for commercial buildings 110, may connect to control system 102 through network 108. Each application 110 may have at least one rotating machine 305 (as shown in FIG. 3) mounted for use in the respective application 110. For example, each commercial building 110 may include an HVAC system with at least one rotating machine 305, such as a compressor or pump, as further detailed below. The HVAC system for each building 110 may further collect and send data to control system 102 through network 108. In one embodiment, the HVAC system for each building 110 may send vibration data, acoustic data, and/or ultrasonic data of a respective machine 305 to control system 102 through network 108. For example, the system in each building 110 may include one or more receivers 111. The one or more receivers 111 may be wired or wirelessly connected to one or more transceivers 113. The one or more receivers 111 may receive the vibration, acoustic, ultrasonic, and other sensor data from wireless sensor bundle 210 and transmit the data to control system 102 through the one or more transceivers 113 via network 108. Control system 102 (via server system 104) may receive the data from each building 110 through network 108.

Control system 102 may further process and perform analytics on the data of the rotating machine 305 of each building 110 for transmission to and display on the one or more mobile computing device 112, to convey, as further detailed below. In particular, control system 102 may process the analytics to generate health reports 402, which may be accessed by users via a web portal 400 through network 108.

Figure 2:
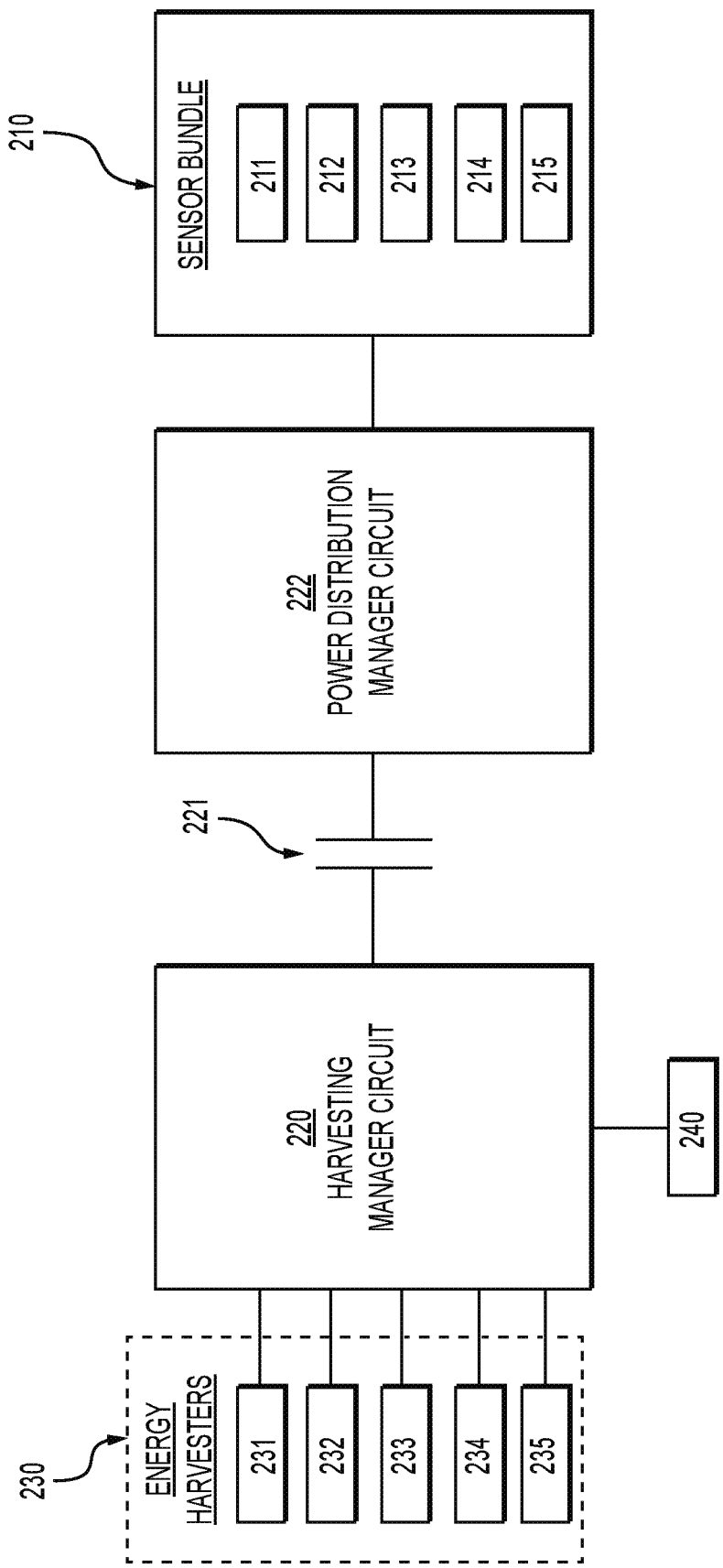
FIG. 2 shows a block diagram of an exemplary power circuit for a wireless sensor bundle, consistent with exemplary embodiments of the present disclosure.

Referring now to FIG. 2, a block diagram is shown depicting an exemplary power circuit for a wireless sensor bundle of an exemplary rotating machine of a system. Because the low voltage direct current power that is useful to the wireless sensor bundle 210 is not available near the machines being monitored, the wireless sensor bundles 210 use a combination of power from a battery 240 and/or energy harvesting devices 230.

The energy harvesting devices may include a combination of an AC phase harvesting device 231, a thermo-electric energy harvesting device 232, a photovoltaic harvesting device 233, a piezoelectric harvesting device 234, and/or other harvesting devices 235 that harness ambient energy and convert it into useable power via overvoltage protection, rectification and filtering, DC-DC conversion, and isolation. The power from the harvesting devices 230 and/or the battery 240 are then input into the harvesting manager circuit 220, which selectively transmits power to an energy storage device 221, such as a capacitor, from where it is transferred to power distribution manager circuit 222 that may then selectively provide power to the respective sensors 211-215 of wireless sensor bundle 210 based on which of the sensors requires power at any given moment. Note that while in the exemplary embodiment the power distribution manager circuit powers a wireless sensor bundle, it may also be used to power any other load, such as a transceiver or receiver The wireless sensors may include a tri-axial vibration sensor 211, an acoustic sensor 212, an ultrasonic sensor 213, a temperature sensor 214, and/or a humidity sensor 215, among others. The power needs for the sensors will vary with respect to their data gathering and transmission functions.

FIG. 3 is a flow chart showing a method for operation of the power circuit of FIG. 2 in an exemplary embodiment of the present disclosure. In the exemplary embodiment, wireless sensor bundle 210 is used to monitor the health of a rotating machine driven by an electric actuator.

Firstly, at S1, the wireless sensor bundle 210 receives a wakeup message when operation of the rotating machine begins. To conserve energy, the wireless sensor bundle operates in a low-power mode until it is necessary to perform measurements via the sensors or to transmit data to a user. Alternatively, the wakeup messages may be employed on a timer irrespective of the operation of the rotating machine to periodically confirm operation of the power circuit and sensor bundle and transmit data.

At S2, a message is transmitted to the power circuit to provide power to the wireless sensor bundle 210 via the power distribution management circuit 222. If enough power is available in energy storage device 221 to satisfy the power demand of the wireless sensor bundle, the power distribution management circuit 222 moves directly to S5 and draws the power from the storage device 221 and transmits it to the wireless sensor bundle 210. Otherwise, the harvesting manager circuit is activated to generate power at S3. The harvesting manager circuit does not store substantial amounts of energy itself, and instead will draw power from the harvesting devices or the battery 240 to deliver power to the storage device 221, as shown at S4.

As discussed above, the energy harvesting devices may include a combination of an AC phase harvesting device 231, a thermo-electric energy harvesting device 232, a photovoltaic harvesting device 233, a piezoelectric harvesting device 234, and/or other harvesting devices 235 that harness ambient energy and convert it into useable power.

Figure 4:
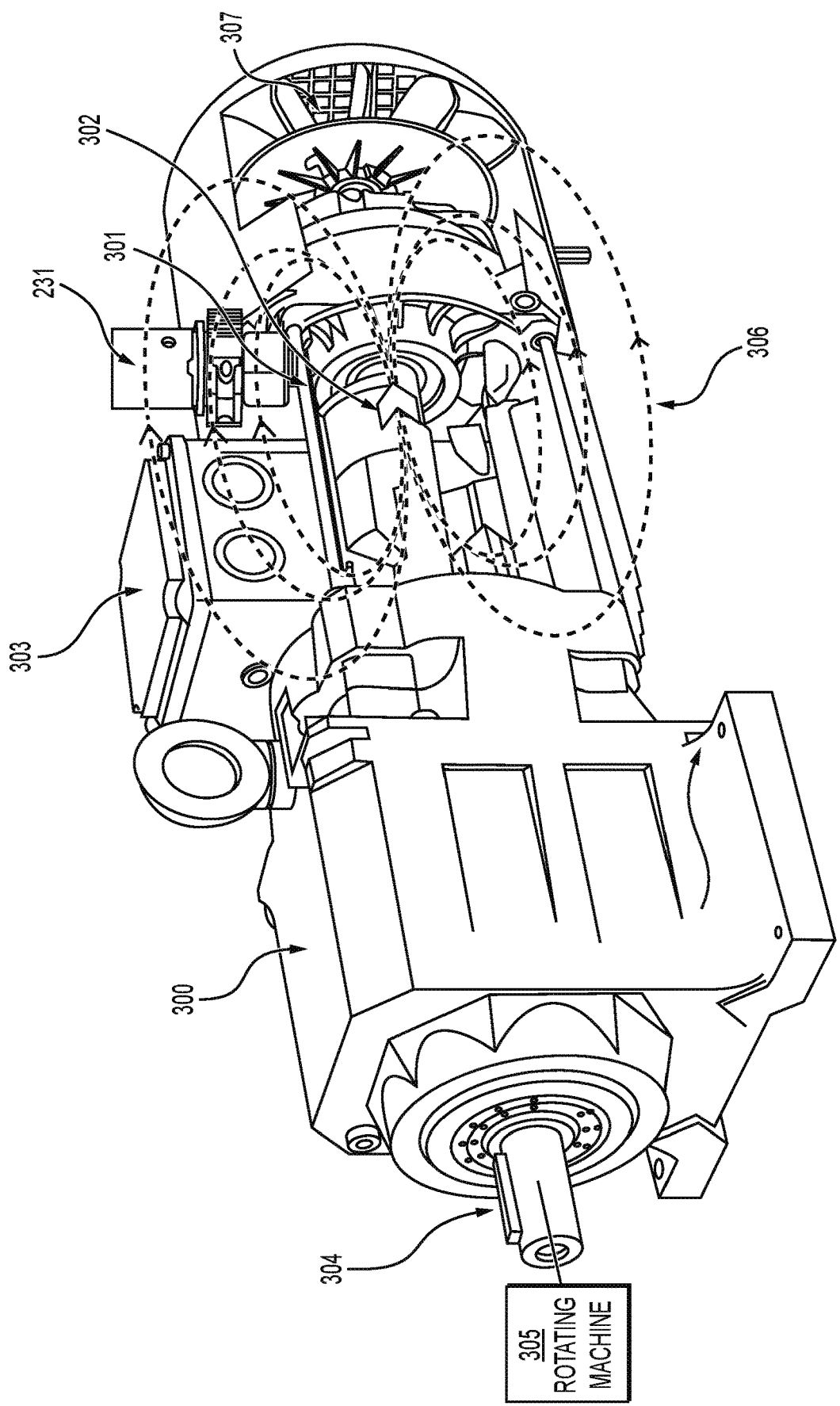
FIG. 4 is an isometric view of an electric actuator driving a rotating machine, consistent with exemplary embodiments of the present disclosure.

FIG. 4 shows an exemplary electric actuator 300 driving a rotating machine 305. The rotating machine may be driven by a variety of electric actuators, such as switched reluctance motors, brushless DC motors, diesel-electric generators, etc. Furthermore, the actuators may be linear, or spherical, and are not limited to solely rotary actuation. The AC phase harvesting device may be employed to harvest energy from any of these types of actuators, requiring only a time varying component of electric current sufficient to induce current in an inductor to be harvested. It is common for motor-driven rotating machines in industrial automation, commercial HVAC, or process industries to be driven by polyphase alternating current motors, particularly three-phase motors. As such, an exemplary embodiment will be described in more detail with respect to an AC phase harvesting device harvesting energy from a three-phase rotary motor.

A typical three phase motor includes a stator 301 surrounding a rotor 302, the stator 301 and rotor 302 interacting when AC power is provided to the motor 300 at terminal box 303. When AC power is provided to the motor 300, the rotor 302 rotates, rotating shaft 304 that is in turn connected to an input shaft of rotating machine 305. The operation of the motor 300 creates a magnetic field 306 as a result of the interaction between the rotor 301 and the stator 302. Fan 307 is provided to help cool the motor as the operation produces a substantial amount of heat, which may also be harnessed by the thermo-electric energy harvesting device 232. The wireless sensor bundle 210 may be used to monitor the health of either the rotating machine 305 or the three phase motor 300 driving the rotating machine 305. In either event, AC phase harvesting device 231 may be used to harvest energy from the motor, as described in more detail in FIG. 5 below.

Figure 5:
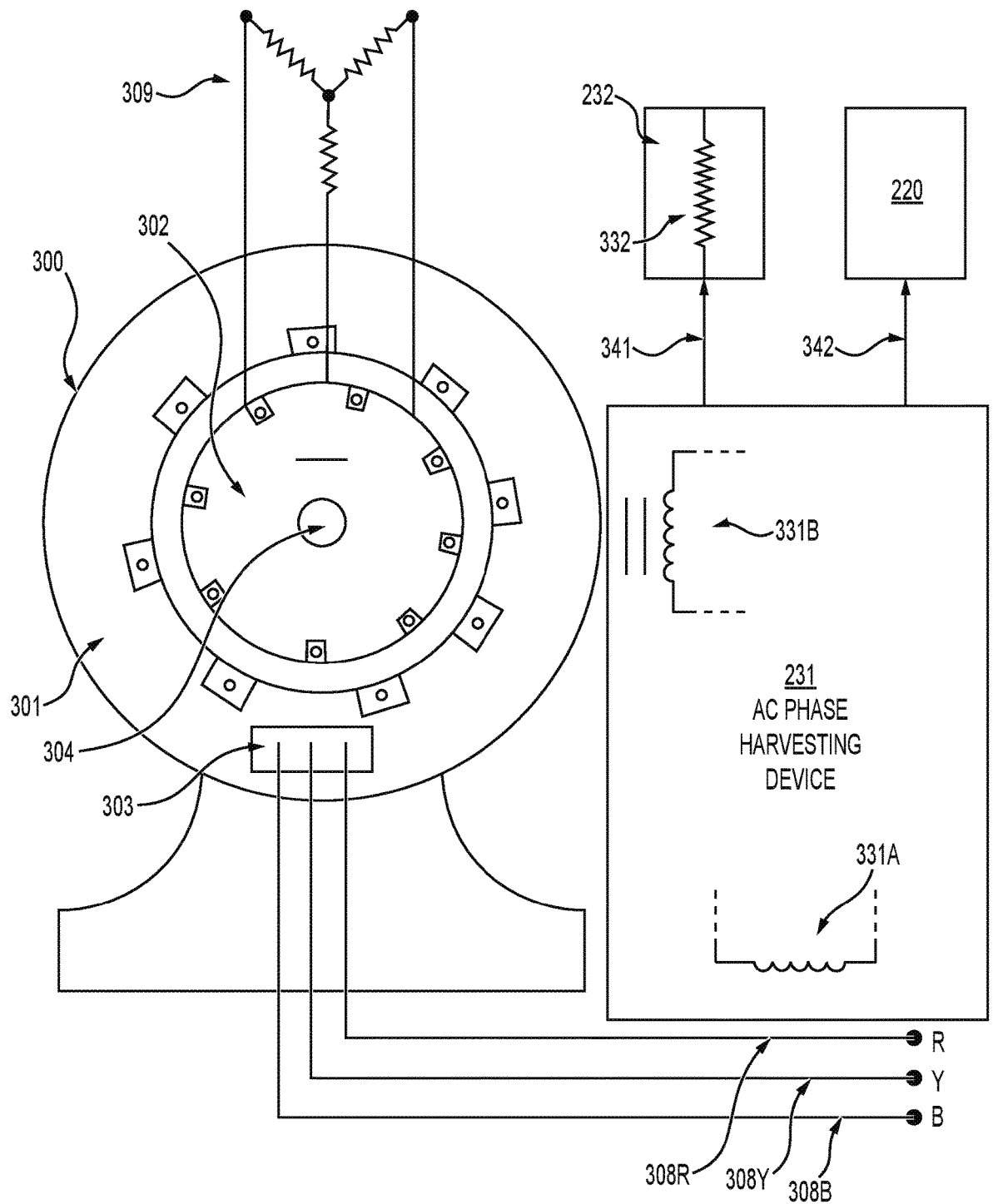
FIG. 5 is a schematic diagram of a three-phase motor and an AC phase harvesting device, consistent with exemplary embodiments of the present disclosure.

FIG. 5 shows the three phase motor 300 in diagram form and demonstrates how the thermo-electric energy harvesting device 232 and the AC phase harvesting device 231 may be provided to harvest energy from the motor 300 in a particular combination. As discussed in FIG. 3 and explained in more detail here in FIG. 4, a three phase motor receives AC power at terminal 303 provided to the stator 301 and rotor 302 to rotate the rotor 302 that is connected to a shaft 304.

The AC power is supplied in three phases at 120 degree intervals via feed wires 308R, 308Y, and 308B. Typically, feed wires 308 for the three phases are designated by one of three colors red, yellow, and blue, each indicating a phase that is 120 degrees out of phase with the other two. A wye-connection 309 is shown in FIG. 4, but the operation of the invention would be substantially the same in any winding configuration.

The thermo-electric energy harvesting device 232 generates energy based on the temperature differential between the motor body temperature and the ambient temperature. As such, it is positioned on the motor body and has a "hot side" in contact with the motor body, with the other side of the thermo-electric energy harvesting device 232 exposed to ambient air in the environment of the motor. As such, the thermo-electric energy harvesting device 232 uses the heat flux between the hot motor body and the ambient air to generate electric energy using the Seebeck effect.

The AC phase harvesting device 231 includes at least one inductor 331 positioned to harness energy from the three phase motor. Inductor 331A is positioned adjacent a feed wire, in this exemplary embodiment, 308R, such that the inductor 331A acquires an induced current from the alternating current in feed wire 308R and converts that induced current into useable power. Inductor 331B is positioned adjacent the stator 301 of three phase motor 300 such that it is in the magnetic field 306 produced by the operation of the motor 300 with the interaction of the stator 301 and the rotor 302. As such, inductor 331B may acquire an induced current, and likewise converts that induced current into useable power (e.g., including overvoltage protection, rectifying, filtering, DC conversion). According to Faraday's law, an electromagnetic field is induced in a conductive loop when the magnetic flux through a surface enclosed by the loop varies in time. In other words, a coil converts a time-varying magnetic field into a time-varying voltage. The stator coils on a motor generate a rotating (and thus time-varying) magnetic field to turn the rotor shaft, and inductor 331B includes a conductive loop to convert the time-varying field into an AC voltage. The AC phase harvesting unit 231 may include either or both of the inductors 331A and 331B. The at least one inductor 331 may include clamping means, such that it is easily positioned and removed in an optimal position adjacent the feed wire or within the magnetic field created by the motor.

Once the AC phase harvesting device 231 has harvested the energy and converted it into useable power, it may transfer the power to the energy harvesting manger circuit 220 via line 342, and/or use the power to supply a voltage via line 341 to a resistor 332 provided on thermo-electric energy harvesting unit 232, the heat of the resistor 332 being harvested by the thermo-electric energy harvesting unit and converted into useable power. This is accomplished by coupling the resistor 332 shown in FIG. 4B to a hot side of the thermo-electric generator, i.e., a side that is positioned on the motor body. This is a particularly advantageous implementation in applications in which a wireless sensor bundle is already attached to a machine or motor, and a user wants to supplement the already existing harvesting system. In such an implementation, the AC phase harvesting device may be added to the bundle without any requirement for modification of the harvesting manager circuit or the power distribution manager circuit. Instead of having an additional harvesting device attached to the circuit, the AC phase harvesting device will simply be used to increase the amount of energy provided to the harvesting manager circuit from the thermo-electric energy harvesting device.

According to various embodiments, the wireless sensor bundle is positioned on a rotating machine or its motor and provides diagnostic information relating to a variety of machinery health metrics, such as tri-axial vibration data, ultrasonic and acoustic data, temperature data at the surface of the machinery, and ambient temperature and humidity data of the environment in which the machinery is being used.

As discussed, the environment may be one in which maintenance of the wireless sensor bundle is either cost prohibitive or otherwise not feasible, requiring power sources that are self-powering from the environmental conditions, and therefore require minimal maintenance and replacement. The types of facilities in which the wireless sensor bundle may be put to use include, but are not limited to, water distribution facilities (e.g., pumps and pump motors), HVAC systems for commercial buildings (e.g., compressors, fan blade motors), food processing and packaging facilities (e.g., homogenizers, dairy processing motors, assembly line motors, mixers), refineries (e.g., oil pumps), etc.

The wireless sensor bundles may be used to transmit data relating to the health of a rotating machine, its driving motor, or both. When a wireless sensor bundle is used to monitor the health of the motor, it is advantageously positioned in close proximity to both a heat source that is useful to the thermo-electric energy harvesting device (as the motor body generates high amounts of heat in operation), and the feed wires and electromagnetic field that are useful to the AC phase harvesting device.

Figure 6:
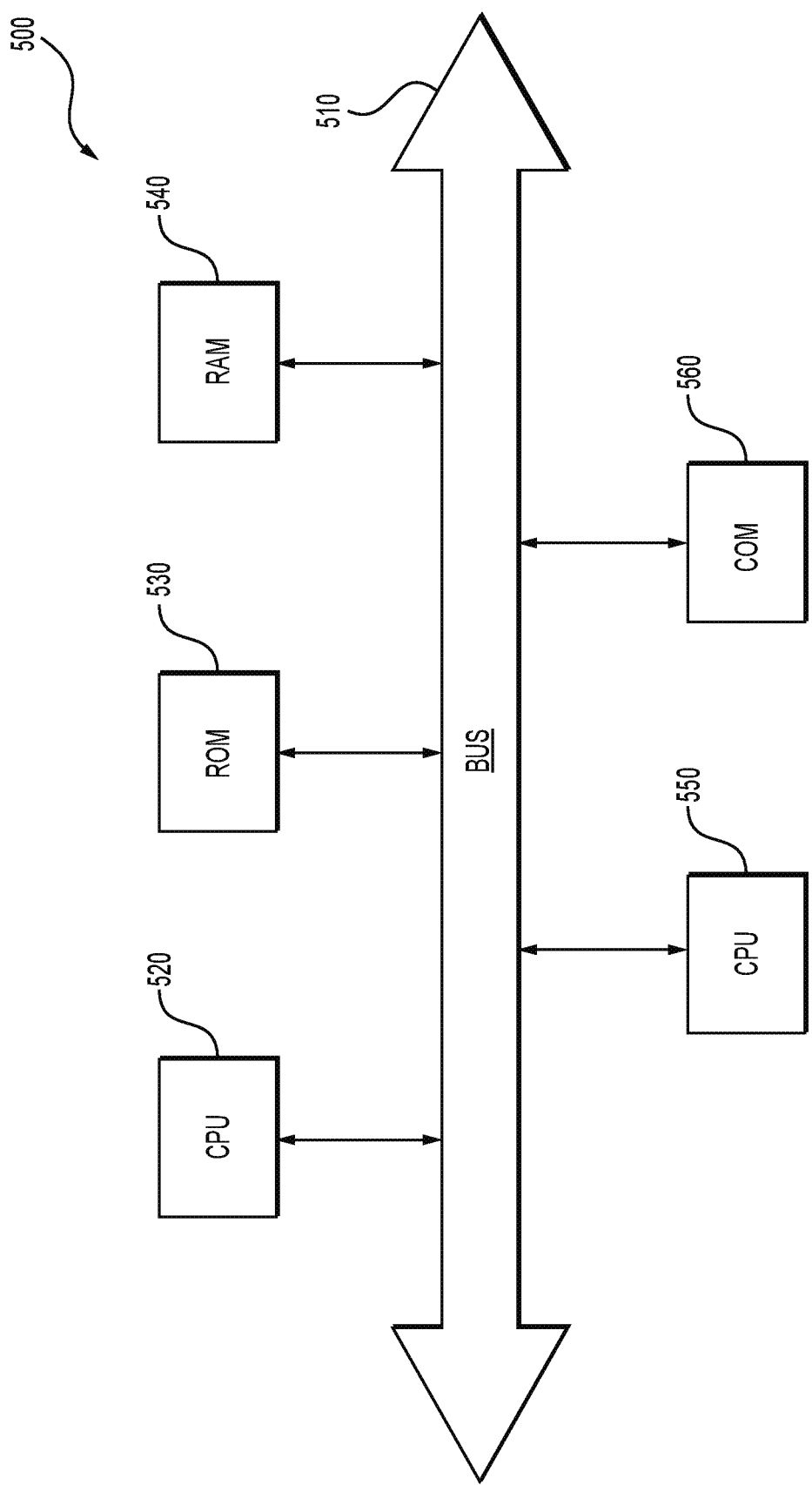
FIG. 6 depicts a high-level functional block diagram of an exemplary computer device or system, in which embodiments of the present disclosure, or portions thereof, may be implemented.

Various embodiments of the present disclosure, as described above in the examples of FIGS. 1-5 may be implemented using computer system 500, shown in FIG. 6. Because the wireless sensor bundle described in this invention is a self-contained unit capable of easy mounting directly in the environments described, it is physically small and is designed to use very little power. As such, a preferred embodiment of the invention would be operated using a low-power microcontroller for the CPU. However, it may be embodied using more powerful computer resources.

After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 6, computer system 600 includes a central processing unit (CPU) 620. CPU 620 may be any type of processor device including, for example, any type of special purpose or a general-purpose microprocessor device. As will be appreciated by persons skilled in the relevant art, CPU 620 also may be a single processor in a multi-core/multiprocessor system, such system operating alone, or in a cluster of computing devices operating in a cluster or server farm. CPU 620 is connected to a data communication infrastructure 610, for example, a bus, message queue, network, or multi-core message-passing scheme.

Computer system 600 also includes a main memory 640, for example, random access memory (RAM), and may also include a secondary memory 630. Secondary memory 630, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc. which is read by and written to by the removable storage drive. As will be appreciated by persons skilled in the relevant art, such a removable storage unit generally includes a computer usable storage medium having stored therein computer software and/or data.

In alternative implementations, secondary memory 630 may include other similar means for allowing computer programs or other instructions to be loaded into computer system 600. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to computer system 600.

Computer system 600 may also include a communications interface ("COM") 660. Communications interface 660 allows software and data to be transferred between computer system 600 and external devices. Communications interface 660 may include a modem, a network interface (such as an Ethernet card), a communications port, a PCM-CIA slot and card, or the like. Software and data transferred via communications interface 660 may be in the form of signals, which may be electronic, electromagnetic, optical, or other signals capable of being received by communications interface 660. These signals may be provided to communications interface 660 via a communications path of computer system 600, which may be implemented using, for example, wire or cable, fiber optics, a phone line, a cellular phone link, an RF link or other communications channels.

The hardware elements, operating systems, and programming languages of such equipment are conventional in nature, and it is presumed that those skilled in the art are adequately familiar therewith. Computer system 600 also may include input and output ports 650 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

It would also be apparent to one of skill in the relevant art that the present disclosure, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

It is to be understood that both the foregoing general description and the following detailed description are exemplary and explanatory only and are not restrictive of the disclosed embodiments, as claimed.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system configured to harvest electrical energy from an electric actuator driving a rotating machine, the system comprising:
    an AC phase harvesting device configured to harvest electrical energy from the electric actuator;
    a thermo-electric energy harvesting device configured to harvest heat energy from the rotating machine;
    a resistor electrically connected to the thermo-electric energy harvesting device, wherein at least a first portion of the electrical energy harvested by the AC phase harvesting device is used to provide an electrical current to the resistor, the electrical current heating the resistor, and heat from the resistor being harvested by the thermo-electric energy harvesting device;
    a harvesting manager circuit configured to receive power from the thermo-electric energy harvesting device, wherein the harvesting manager circuit is electrically connected to the AC phase harvesting device and a second portion of the energy from the AC phase harvesting device is transmitted to the harvesting manager circuit;
    an energy storage device configured to store power transmitted from the harvesting manager circuit; and
    a power distribution manager circuit configured to transfer power from the energy storage device to a wireless sensor bundle associated with the rotating machine.

2. The system of claim 1, wherein the electric actuator is a polyphase motor, and the AC phase harvesting device includes an inductor attached to a feed wire of one phase of the polyphase motor, the inductor generating an electric current by induction from the feed wire.

3. The system of claim 2, wherein the AC phase harvesting device further includes an inductor positioned adjacent to the polyphase motor, the inductor generating an electric current by induction from magnetic fields produced by the polyphase motor.

4. The system of claim 1, wherein the AC phase harvesting device includes an inductor positioned adjacent to the electric actuator, the inductor generating an electric current by induction from magnetic fields produced by the electric actuator.

5. The system of claim 1, wherein the harvesting manager circuit is configured to receive power from the AC phase harvesting device.

6. The system of claim 1, further comprising a battery connected to the harvesting manager circuit.

7. The system of claim 1, further comprising a piezoelectric harvesting device connected to the harvesting manager circuit.

8. The system of claim 1, further comprising a photovoltaic harvesting device connected to the harvesting manager circuit.

9. The system of claim 1, further comprising a battery, a piezoelectric harvesting device, and a photovoltaic harvesting device connected to the harvesting manager circuit.

10. The system of claim 1, wherein the energy storage device is a capacitor.

11. A system comprising:
an electric actuator driving a rotating machine;
a wireless sensor bundle configured to sense parameters of the rotating machine indicative of degradation;
an AC phase harvesting device configured to harvest electrical energy from the electric actuator;
a harvesting manager circuit configured to receive power from the AC phase harvesting device, wherein the harvesting manager circuit is electrically connected to the AC phase harvesting device and a second portion of the energy from the AC phase harvesting device is transmitted to the harvesting manager circuit;
an energy storage device configured to store power from the harvesting manager circuit; and
a power distribution manager circuit configured to transfer power from the energy storage device to the wireless sensor bundle;
wherein the AC phase harvesting device includes an inductor positioned adjacent to a feed wire of the electric actuator, the inductor generating an electric current by induction from the feed wire.

12. The system of claim 11, wherein the AC phase harvesting device further includes a second inductor positioned adjacent to a body of the electric actuator, the second inductor generating an electric current by induction from magnetic fields produced by the electric actuator.

13. The system of claim 11, wherein the wireless sensor bundle comprises a tri-axial vibration sensor, an ultrasonic sensor, and an acoustic sensor.

14. The system of claim 11, further comprising a battery, a thermo-electric energy harvesting device, a piezoelectric harvesting device, and a photovoltaic harvesting device connected to the harvesting manager circuit.

15. The system of claim 14, wherein a resistor is coupled to the thermo-electric energy harvesting device and electrically connected to the AC phase harvesting device, wherein a first portion of the energy from the AC phase harvesting device is used to provide an electrical current to heat the resistor, the heat from the resistor being harvested by the thermo-electric energy harvesting device.

16. A computer-implemented method comprising:
receiving, at a harvesting manager circuit, power from an energy harvesting device, wherein the harvesting manager circuit is electrically connected to an AC phase harvesting device and a second portion of energy from the AC phase harvesting device is transmitted to the harvesting manager circuit;
transferring power from the harvesting manager circuit to an energy storage device;
receiving, at a power distribution manager circuit, power from the energy storage device; and
transferring power from the power distribution manager circuit to a load, an amount of power distributed being based on a power demand of the load;
wherein the power from the energy harvesting device includes power generated from the AC phase harvesting device, the AC phase harvesting device comprising an inductor configured to be positioned adjacent to a feed wire of an electric actuator, the inductor generating an electric current by induction from the feed wire.

17. The method of claim 16, wherein the AC phase harvesting device further includes a second inductor configured to be electric actuator positioned adjacent to a body of the electric actuator, the second inductor generating an electric current by induction from magnetic fields produced by the electric actuator.

18. The method of claim 16, wherein the harvesting manager circuit is further configured to be connected to a battery.

19. The method of claim 16, further comprising a thermo-electric energy harvesting device, a piezoelectric harvesting device, and/or a photovoltaic harvesting device connected to the harvesting manager circuit.

20. The method of claim 18, wherein a resistor is coupled to the thermo-electric energy harvesting device and electrically connected to the AC phase harvesting device, wherein a first portion of the energy from the AC phase harvesting device is used to provide an electrical current to heat the resistor, the heat from the resistor being harvested by the thermo-electric energy harvesting device.

* * * * *